(12) United States Patent
Gennetten et al.

(10) Patent No.: US 6,710,805 B1
(45) Date of Patent: Mar. 23, 2004

(54) SIMPLIFIED USER INTERFACE FOR DIGITAL CAMERA

(75) Inventors: K Douglas Gennetten, Ft Collins, CO (US); Amy E Battles, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/491,958

(22) Filed: Jan. 26, 2000

(51) Int. Cl.[7] ................................................ H04N 5/222
(52) U.S. Cl. .................................. 348/333.02; 348/373
(58) Field of Search ........................... 348/333.02, 373, 348/375, 207.1, 207.11, 333.01; 386/118

(56) References Cited

U.S. PATENT DOCUMENTS 6,141,052 A * 10/2000 Fukumitsu et al. ......... 348/373
6,177,957 B1 * 1/2001 Anderson ............... 348/231.99
6,307,526 B1 * 10/2001 Mann ....................... 348/207.1
6,404,981 B1 * 6/2002 Kumagai et al. ........... 386/125
6,519,003 B1 * 2/2003 Swayze ....................... 348/375

OTHER PUBLICATIONS

Windows 95 For Dummies, 1995, IDG Books Worldwide, Inc, pp. 84–87.*

* cited by examiner

Primary Examiner—Wendy R. Garber
Assistant Examiner—Matthew L Rosendale

(57) ABSTRACT

A user interface for selecting a function for a device, such as a digital camera, to perform. The interface comprises a five position switch, such as a four-way rocker switch, a three position switch, such as a two-way rocker switch, and a visual display comprising a menu displaying a list of functions which the camera can perform. The camera user can easily and conveniently make his selection using one thumb on the five position switch and his other thumb on the three position switch while maintaining a grasp on the camera with his hands.

15 Claims, 1 Drawing Sheet

SIMPLIFIED USER INTERFACE FOR DIGITAL CAMERA

FIELD OF THE INVENTION

The present invention relates generally to digital cameras and more particularly to user interfaces for digital cameras and even more particularly to the use of switches on digital cameras used to control the camera function.

BACKGROUND OF THE INVENTION

Existing digital cameras use a wide range of user interfaces to set and control their function. Existing camera user interfaces are typically a point of confusion to users, often because of their non-intuitive controls and a lack of similarity with other device user interfaces. Such user interfaces often require a careful reading of the manual prior to first use of the camera and for less often used features repeated manual reading may be necessary.

These user interfaces typically consist of numerous switches that are often difficult to actuate while also holding and/or using the camera. This quantity and arrangement of switches also complicates package design and adds to overall product cost.

Thus, there is a need for a simplified, improved user interface for digital cameras and similar devices.

SUMMARY OF THE INVENTION

In preferred embodiments, the present patent document discloses user interfaces that provide the ability to select a function for a device to perform. In a preferred embodiment, switches operated by each of a user's thumbs provide the means for the user to select a function for a digital camera to perform. The user of the digital camera can easily and conveniently make his selection and activate a desired menu listed function while holding the camera. Embodiments of user interfaces described herein can be used with various devices, in particular with image recording devices such as digital cameras and video cameras. The user interfaces disclosed herein, however, are not limited to use with only these devices. It has general applicability to all devices controlled by a user.

The user interface comprises a five position switch, a three position switch, and a visual display. In preferred embodiments, the five position switch, the three position switch, and the visual display are mounted onto the digital camera. Typically the five position switch is a four-way rocker switch, the three position switch is a two-way rocker switch, and the visual display is a liquid crystal display (LCD display) or Light Emitting Diode (LED) display. Other types of displays are also possible.

Activations of the four-way rocker switch and the two-way rocker switch permit selection, activation, and deactivation of various functions which are indicated on the visual display. These switch activations might include navigating through a menu structure and selecting a function setting or navigating through a file structure of photographs.

In a preferred embodiment, the user interface is mounted onto the back of the digital camera and is viewable by a user when the user grasps the camera with his first hand and his second hand while keeping his first thumb in proximity to the four-way rocker switch and his second thumb in proximity to the two-way rocker switch.

In another preferred embodiment, the visual display is viewable by the user when the user looks through a view finder mounted onto the camera.

A primary advantage of the embodiments as described in the present patent document over prior user interfaces is that they are simple and intuitive to use, thereby reducing user confusion and the need for extensive reading and re-reading of the user's manual for the device. Also, only two combination switches having a total of six switch positions are needed further reducing confusion. Most currently available digital cameras employ ten or more switches.

An additional advantage of the user interfaces is the ability of the user to maintain his grasp of the device, such as the digital camera, while navigating through and observing the various menus displayed on the visual display and while selecting the functions to be performed by the device by using a four-way rocker switch and a two-way rocker switch. A further advantage in another embodiment is the displaying of the visual display in the view finder permitting function selection while viewing the image to photographed through the view finder. In either case, the user never has to remove his thumbs from the rocker switches and never has to look away from the visual display to find the appropriate switch.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and.

DETAILED DESCRIPTION OF THE PREFERRED EMBODIMENTS

1. Introduction

Figure 1:
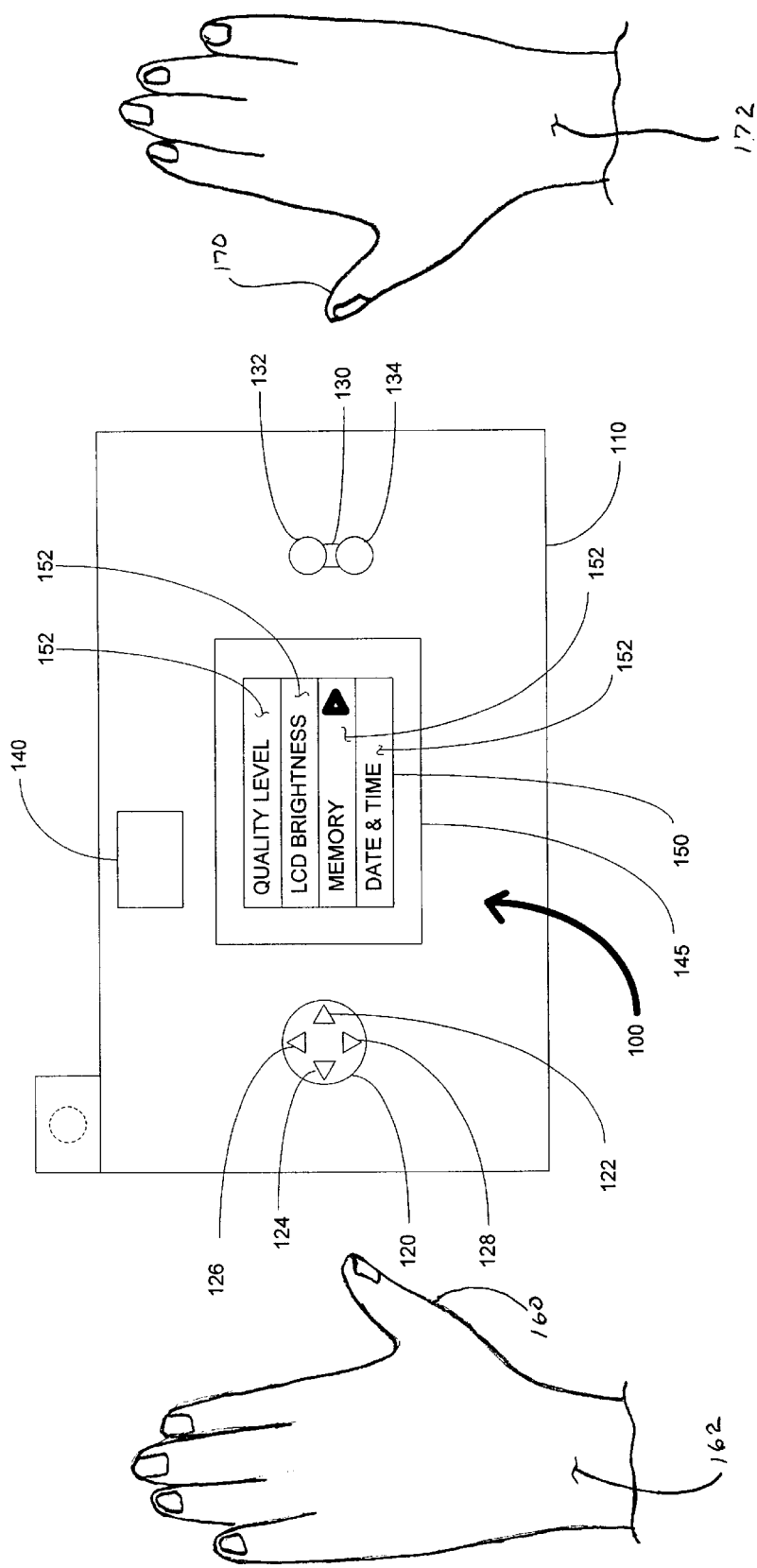
FIG. 1 is a drawing of a user interface for selecting a function for a device to perform in accordance with the invention.

As shown in the drawings for purposes of illustration, the present patent document discloses in preferred embodiments means for selecting a function for a device to perform. In a preferred embodiment, a user of a digital camera can easily and conveniently select and activate a desired menu listed function using only his two thumbs while at the same time holding the camera. In the following detailed description and in the several figures of the drawings, like elements are identified with like reference numerals.

2. Discussion

In a preferred embodiment of the apparatus described in the present patent document, switches operated by each of a user's thumbs provide the means for the user to select a function for a digital camera to perform.

FIG. 1 is a drawing of a user interface 100 for selecting a function for a device 110 to perform in accordance with the invention. In the preferred embodiment, the device 110 is an image recording device 110 such as a digital camera 110. However, it is also possible to use the user interface 100 with other devices 110 such as a video camera 110. The user interfaces disclosed herein, however, are not limited to use with only these devices. It has general applicability to all devices controlled by a user.

The user interface 100 in FIG. 1 comprises a five position switch 120, a three position switch 130, and a visual display 145. The five position switch 120, the three position switch 130, and the visual display 145 are typically mounted onto the digital camera 110.

The five position switch 120, which in the preferred embodiment is a four-way rocker switch 120, comprises a first switch position 122, a second switch position 124, a third switch position 126, a fourth switch position 128, and a neutral or "off" switch position. The first, second, third, and fourth switch positions 122,124,126,128 can be individually activated by a first thumb 160 attached to a first hand 162 of a user of the digital camera 110.

The three position switch 130, which in the preferred embodiment is a two-way rocker switch 130, comprises a fifth switch position 132, a sixth switch position 134, and a neutral or "off" switch position. The fifth and sixth switch positions 132,134 can be individually activated by a second thumb 170 attached to a second hand 172 of a user of the digital camera 110. The placement of the five position switch 120 on the left hand side of the device 110 and the three position switch 130 on the right hand side of the device 110 as shown in FIG. 1 is for illustrative purposes only, as is the choice of the first thumb 160 as the left thumb of the user, the first hand 162 as the left hand, the second thumb 170 as the right thumb, and the second hand 172 as the right hand. The placement of the five position switch 120 and the three position switch 130, selection of thumbs, and selection of hands could all be interchanged. Further, placement of the five position switch 120 and the three position switch 130 is limited only to the extent that they are operable while the camera is grasp by the first and second hands 162,172.

In preferred embodiments, the visual display 145 is a liquid crystal display (LCD display) 145 or a light emitting diode (LED) display 145. However, other display technologies are also possible. The visual display 145 comprises at least one menu 150, but typically several menus 150. Each menu 150 comprises at least one function label 152, but typically several function labels.

In the preferred embodiment, activations of the first and second switch positions 122,124 select successive menus 150, activations of the third and fourth switch positions 126,128 select successive function labels 152 on the selected menu 150, activation of the fifth switch position 132 activates the function identified by the selected function label 152, and activation of the sixth switch position 134 deactivates the function. Other uses for these switches 120,130 are also possible, for example navigating through a tree structure of picture files or other data.

In another preferred embodiment, activations of the first and second switch positions 122,124 select successive menus 150, activations of the fifth and sixth switch positions 132,134 select successive function labels 152 on the selected menu 150, activation of the third switch position 126 activates the function identified by the selected function label 152, and activation of the fourth switch position 128 deactivates the function.

In yet another preferred embodiment, activations of the fifth and sixth switch positions 132,134 select successive menus 150, activations of the third and fourth switch positions 126,128 select successive function labels 152 on the selected menu 150, activation of the first switch position 122 activates the function identified by the selected function label 152, and activation of the second switch position 124 deactivates the function.

In a preferred embodiment, the user interface 100 is mounted onto the back of the digital camera 110 and is viewable by a user when the user grasps the camera 110 with his first hand 162 and his second hand 172 while keeping his first thumb 160 in proximity to the four-way rocker switch 120 and his second thumb 170 in proximity to the two-way rocker switch 130.

In another preferred embodiment, the visual display 145 is viewable by the user when the user looks through a view finder 140 mounted onto the camera 110.

3. Concluding Remarks

A primary advantage of the embodiments as described in the present patent document over prior user interfaces 100 is that the user interfaces 100 are simple and intuitive to use, thereby reducing user confusion and the need for extensive reading and re-reading of the user's manual for the device 110. Also, only two switches 120,130 having a total of six switch positions 122,124,126,128,132,134 are needed, further reducing confusion. Most currently available digital cameras 110 employ ten or more switches.

An additional advantage is the ability of the user to maintain his grasp of the device 110, such as the digital camera 110, while navigating through and observing the various menus 145 displayed on the visual display 145 and while selecting the functions to be performed by the device 110 by using two switches, which in the preferred embodiment are the four-way rocker switch 120 and the two-way rocker switch 130. A further advantage is manifest by displaying the visual display 145 in the view finder 140 permitting function selection while viewing the image to be photographed through the view finder 140. In either case, the user never has to remove his thumbs from the two switches 120,130 and never has to look away from the visual display to find the appropriate switch 120,130.

While the present invention has been described in detail in relation to preferred embodiments thereof, the described embodiments have been presented by way of example and not by way of limitation. It will be understood by those skilled in the art that various changes may be made in the form and details of the described embodiments resulting in equivalent embodiments that remain within the scope of the appended claims.

What is claimed is:

1. A user interface for a camera, comprising:
   a four-way rocker switch comprising a first, a second, a third, and a fourth switch positions;
   a two-way rocker switch comprising a fifth and a sixth switch positions; and
   a visual display comprising at least one menu,
      wherein the four-way rocker switch, the two-way rocker switch, and the visual display are mounted on the same side of the camera,
      wherein images to be photographed are located on opposite side of the camera from which the four-way rocker switch, the two-way rocker switch, and the visual display are mounted,
      wherein the first, second, third, and fourth switch positions can be individually activated by a thumb on a first hand of an operator and simultaneously the fifth and sixth switch positions can be individually activated by a thumb on a second hand of the operator when the operator holds the camera with the first hand on one end of the camera and the second hand on the opposite end thereof,
      wherein each menu comprises at least one function label,
      wherein activations of the first and second switch positions select successive menus,
      wherein activations of the third and fourth switch positions select successive function labels on the selected menu, wherein activation of the fifth switch position activates the function identified by the selected function label,
wherein the identified function controls an action of the camera, and
wherein activation of the sixth switch position deactivates the function.

2. The user interface as recited in claim 1, wherein the camera is selected from the group consisting of a digital camera and a video camera.

3. The user interface as recited in claim 1, wherein the visual display is a display selected from the group consisting of an LCD display and an LED display.

4. The user interface as recited in claim 1, wherein the visual display is viewable by a user when the user grasps the camera with the first and the second hands with the first thumb on the four-way rocker switch and the second thumb on the two-way rocker switch.

5. The user interface as recited in claim 1, wherein the visual display is viewable by the user when the user looks through a view finder mounted onto the device.

6. A user interface for a camera, comprising:
a four-way rocker switch comprising a first, a second, a third, and a fourth switch positions;
a two-way rocker switch comprising a fifth and a sixth switch positions; and
a visual display comprising at least one menu,
wherein the four-way rocker switch, the two-way rocker switch, and the visual display are mounted on the same side of the camera,
wherein images to be photographed are located on opposite side of the camera from which the four-way rocker switch, the two-way rocker switch, and the visual display are mounted,
wherein the first, second, third, and fourth switch positions can be individually activated by a thumb on a first hand of an operator and simultaneously the fifth and sixth switch positions can be individually activated by a thumb on a second hand of the operator when the operator holds the camera with the first hand on one end of the camera and the second hand on the opposite end thereof,
wherein each menu comprises at least one function label,
wherein activations of the first and second switch positions select successive menus,
wherein activations of the fifth and sixth switch positions select successive function labels on the selected menu,
wherein activation of the third switch position activates the function identified by the selected function label,
wherein the identified function controls an action of the camera, and
wherein activation of the fourth switch position deactivates the function.

7. The user interface as recited in claim 6, wherein the camera is selected from the group consisting of a digital camera and a video camera.

8. The user interface as recited in claim 6, wherein the visual display is a display selected from the group consisting of an LCD display and an LED display.

9. The user interface as recited in claim 6, wherein the visual display is viewable by a user when the user grasps the camera with the first and the second hands with the first thumb on the four-way rocker switch and the second thumb on the two-way rocker switch.

10. The user interface as recited in claim 6, wherein the visual display is viewable by the user when the user looks through a view finder mounted onto the device.

11. A user interface for a camera, comprising:
a four-way rocker switch comprising a first, a second, a third, and a fourth switch positions;
a two-way rocker switch comprising a fifth and a sixth switch positions; and
a visual display comprising at least one menu,
wherein the four-way rocker switch, the two-way rocker switch, and the visual display are mounted on the same side of the camera,
wherein images to be photographed are located on opposite side of the camera from which the four-way rocker switch, the two-way rocker switch, and the visual display are mounted,
wherein the first, second, third, and fourth switch positions can be individually activated by a thumb on a first hand of an operator and simultaneously the fifth and sixth switch positions can be individually activated by a thumb on a second hand of the operator when the operator holds the camera with the first hand on one end of the camera and the second hand on the opposite end thereof,
wherein each menu comprises at least one function label,
wherein activations of the fifth and sixth switch positions select successive menus,
wherein activations of the third and fourth switch positions select successive function labels on the selected menu,
wherein activation of the first switch position activates the function identified by the selected function label,
wherein the identified function controls an action of the camera, and
wherein activation of the second switch position deactivates the function.

12. The user interface as recited in claim 11, wherein the camera is selected from the group consisting of a digital camera and a video camera.

13. The user interface as recited in claim 11, wherein the visual display is a display selected from the group consisting of an LCD display and an LED display.

14. The user interface as recited in claim 11, wherein the visual display is viewable by a user when the user grasps the camera with the first and the second hands with the first thumb on the four-way rocker switch and the second thumb on the two-way rocker switch.

15. The user interface as recited in claim 11, wherein the visual display is viewable by the user when the user looks through a view finder mounted onto the device.

* * * * *